(No Model.) 2 Sheets—Sheet 1.

E. O'NEILL.
CUT-OFF VALVE GEAR.

No. 271,352. Patented Jan. 30, 1883.

Witnesses,
Geo. H. Strong.
L. H. Crouse

Inventor,
Eugene O'Neill
By Dewey & Co.
Attys (No Model.) 2 Sheets—Sheet 2.

E. O'NEILL.
CUT-OFF VALVE GEAR.

No. 271,352. Patented Jan. 30, 1883.

Witnesses:
Walter Fowler,
R. K. Evans.

Inventor:
Eugene O'Neill
by
A. N. Evans & Co.
Attys

UNITED STATES PATENT OFFICE.

EUGENE O'NEILL, OF SAN FRANCISCO, CALIFORNIA.

CUT-OFF-VALVE GEAR.

SPECIFICATION forming part of Letters Patent No. 271,352, dated January 30, 1883.

Application filed February 18, 1882. (No model.)

*To all whom it may concern:*

Be it known that I, EUGENE O'NEILL, of the city and county of San Francisco, State of California, have invented an Automatic Cut-Off-Valve Gear for Engines; and I hereby declare the following to be a full, clear, and exact description thereof.

My invention relates to an automatic cut-off for engines, which is operated by a governor, or by air, steam, or water pressure; and it consists in the combination of a valve mechanism and valve-tripping devices with a governor, or with a cylinder within which a piston is moved by the pressure of air, steam, or water to actuate the tripping-arms, by which the steam-valves are released, so as to regulate their point of cutting off and the amount of steam which will be let into the cylinder at each stroke, as will be more fully explained by reference to the accompanying drawings, in which—

Figure 1:
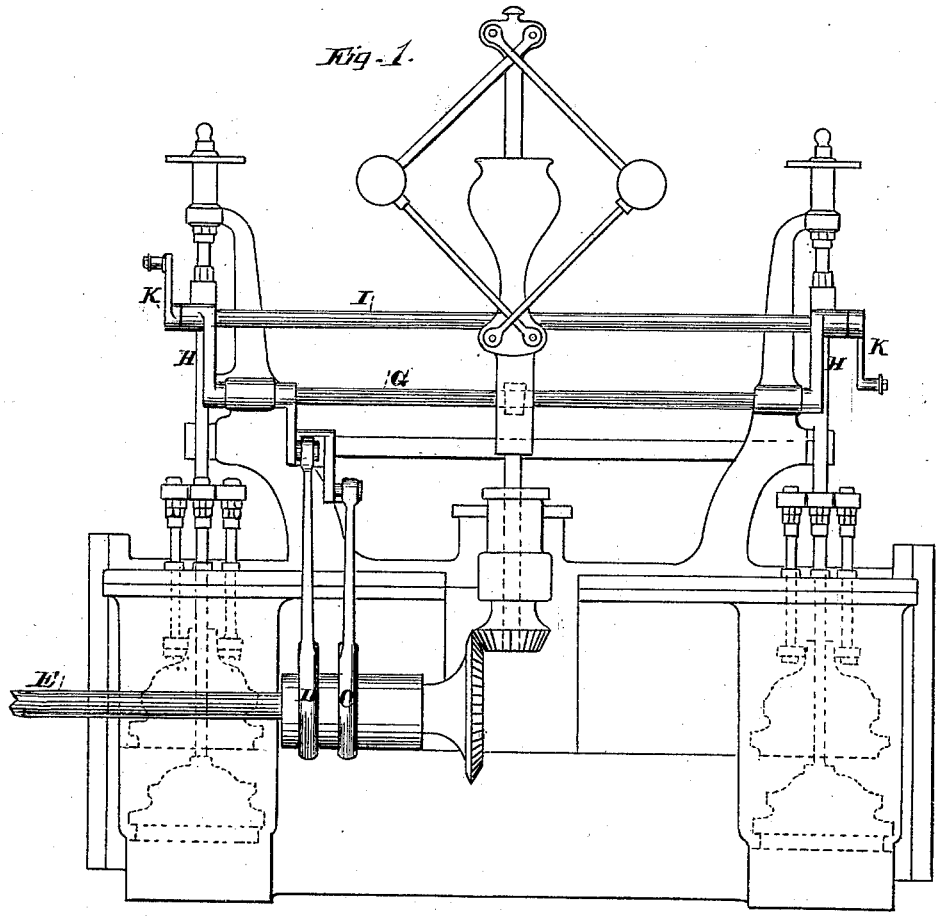
Figure 2:
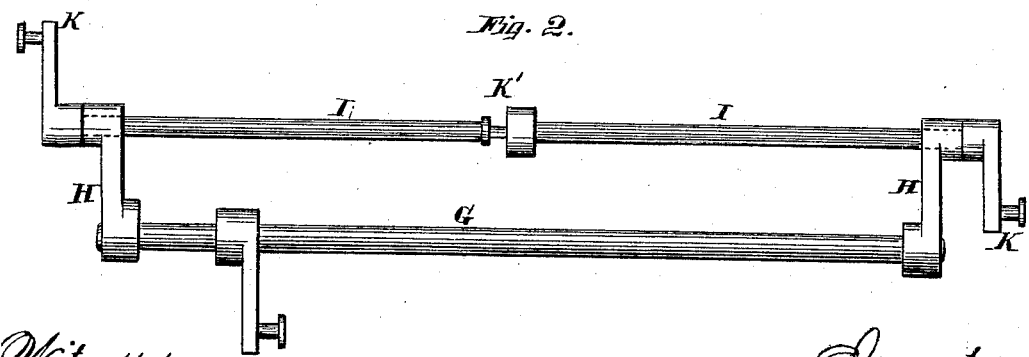
Figure 3:
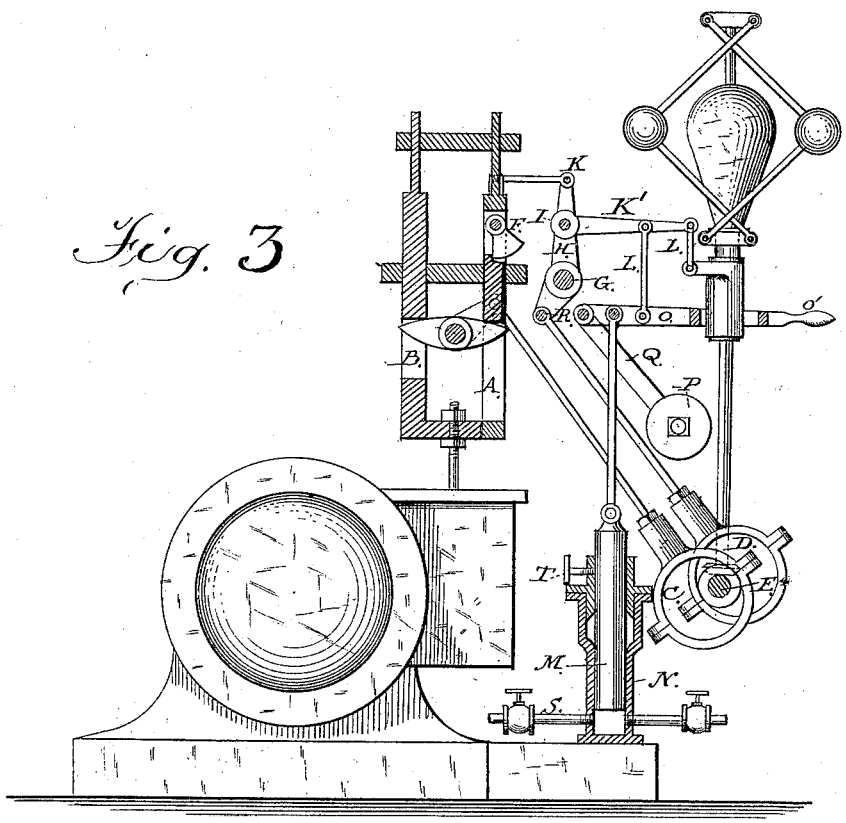

Figure 1 is a side view of the engine. Figs. 2 and 3 are details of construction.

A is the stem of the steam-inlet valve, and B is the stem of the exhaust-valve. These valves are operated by a mechanism which is fully shown and described in a patent which was issued to me May 25, 1880, No. 227,918; and my present invention is designed to provide a means for regulating the point at which the steam is to be cut off and by which the speed of the engine is governed.

The eccentric C, by which the valves are opened, and the one D, by which the cut-off is operated, are fixed to a shaft, E, which extends parallel with the cylinder at one side, and is driven by a bevel-gearing from the main engine-shaft.

The cut-off mechanism consists of a rocker-arm, F, which is oscillated so as to trip the valve at the proper time, and the change in its position fixes the time, as shown in my former patent.

In the present case I have shown a rock-shaft, G, supported parallel with the cylinder and oscillated by means of the eccentric D. Crank-arms H are fixed to it at each end, and these are united by a loose shaft, I, upon which the crank-arms K are fixed. These arms are held, so as to be moved with the oscillations of the arms H and shaft I by an arm, K', which is fixed to the shaft I, and has a connecting-rod, L, which unites it with the governor or regulator. The upper ends of the arms K are connected with the rocker-arms, so that any change in their position relative to their shaft will produce a corresponding change in the angle of the rocker-arm and the time of the tripping of the valve. The arm K' may be connected with the movable sleeve upon the governor-spindle, so as to be operated by the action of the governor; or it may be connected with the piston M, which moves within the cylinder N, and is operated either by the pressure of steam from the boiler which supplies the engine, or by the pressure of air from the receiver into which air is being forced by the engine, or by the pressure of water from a receiver or accumulator which is supplied by the engine. The pipe S connects the cylinder with the boiler or receiver from which pressure is derived. In the present case the piston or plunger M is connected with a lever-arm, O, and this is connected with the arm K' by the rod L, so that the movements of the pistons are transmitted to the rocker-arms and the tripping mechanism, as before described.

P is a weight, which is fixed upon an arm, Q, extending downward and outward diagonally from the shaft R, which forms the fulcrum of the lever O. When the piston raises the lever, and then turns the fulcrum R, it will also raise the weight, and when the pressure upon the piston decreases, the weight acts to force the piston down and return the parts to their former position.

It will be seen that the weight prevents any sudden changes by its inertia, and its power increases as the piston is raised, because it is carried farther from a perpendicular. The lever O has a handle at O', by which it and the connected parts may be moved independent of the pressure-cylinder or governor. A set-screw, T, serves to clamp or hold the piston at any point, so that the engineer may set the cut-off at any desired point independent of the automatic regulating device.

I am aware that a piston running in a cylinder under the pressure of steam, air, or water, and connected with the valve-tripping or cut-off mechanism of an engine by intermediate mechanism, is old, and such I do not wish to be understood as claiming broadly as of my invention.

Having thus described my invention, what I claim as new, and desire to secure by Letters Patent, is—

1. The means herein described for operating the cut-off mechanism of an engine, consisting of the arms K K, connected with the valve-tripping devices, and the arm K', connected with the regulating or governing apparatus, as shown, said arms being keyed to a shaft, I, journaled in the ends of the cranks H, which are keyed to the shaft G, so as to be oscillated by the action of the eccentric from the main shaft, substantially as herein described.

2. The cut-off-regulating device of an engine, consisting of the piston M, moving within the cylinder N, and connected with the steam-valve-tripping devices, as shown, in combination with the lever O O' and the set-screw T, substantially as herein described.

3. The arm Q, secured to the shaft R so as to remain normally at an incline to a perpendicular, and provided with the weight P at its end, in combination with the lever O and cut-off-regulating device M N, whereby the change of the arm Q in relation to the perpendicular automatically varies the resistance of weight P, substantially as set forth.

In witness whereof I have hereunto set my hand.

EUGENE O'NEILL.

Witnesses:
S. H. NOURSE,
G. W. EMERSON.